US011468765B2

(12) United States Patent
Ivanov et al.

(10) Patent No.: US 11,468,765 B2
(45) Date of Patent: Oct. 11, 2022

(54) GENERATING ROAD SEGMENT ATTRIBUTES BASED ON SPATIAL REFERENCING

(71) Applicant: HARMAN BECKER AUTOMOTIVE SYSTEMS GMBH, Karlsbad-Ittersbach (DE)

(72) Inventors: Volodymyr Ivanov, Odelzhausen (DE); Alexey Pryakhin, Munich (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 164 days.

(21) Appl. No.: 15/653,326

(22) Filed: Jul. 18, 2017

(65) Prior Publication Data

US 2018/0025029 A1  Jan. 25, 2018

Related U.S. Application Data

(60) Provisional application No. 62/364,805, filed on Jul. 20, 2016.

(51) Int. Cl.
*G01C 21/30* (2006.01)
*G01C 21/28* (2006.01)
(Continued)

(52) U.S. Cl.
CPC ......... *G08G 1/0104* (2013.01); *G01C 15/002* (2013.01); *G01C 21/26* (2013.01); *G01C 21/28* (2013.01); *G01C 21/30* (2013.01); *G01C 21/32* (2013.01); *G01C 21/3415* (2013.01); *G01C 21/36* (2013.01); *G01C 21/3697* (2013.01); *G01S 19/51* (2013.01); *G01S 19/53* (2013.01); *G06F 8/65* (2013.01); *G06F 9/44526* (2013.01);
(Continued)

(58) Field of Classification Search
None
See application file for complete search history.

(56) References Cited

U.S. PATENT DOCUMENTS 4,796,191 A  1/1989 Honey et al.
6,856,897 B1  2/2005 Phuyal et al.
(Continued)

OTHER PUBLICATIONS

Non-Final Office Action received for U.S. Appl. No. 15/653,308 dated Apr. 16, 2019, 34 pages.
(Continued)

*Primary Examiner* — Eddy Cheung
(74) *Attorney, Agent, or Firm* — Artegis Law Group, LLP (57) ABSTRACT

In one embodiment, an attribute application associates content with a road segment. In operation, the attribute application generates a spatial reference identifier based on coordinates associated with the attribute. The attribute application then generates an attribute based on the content and the spatial reference identifier. Finally, the attribute application transmits the road segment attribute to a navigation system that performs at least one navigation operation based on a road database and the attribute. Because the attribute is specified based on spatial referencing, the attribute application requires fewer resources to generate attributes than conventional approaches that generate different attributes for different versions and formats of road databases.

20 Claims, 5 Drawing Sheets

(51) Int. Cl.

| | | |
|---|---|---|
| *G01C 21/26* | (2006.01) | |
| *G06F 16/29* | (2019.01) | |
| *G01C 21/36* | (2006.01) | |
| *G01C 21/32* | (2006.01) | |
| *G06T 17/05* | (2011.01) | |
| *G01C 21/34* | (2006.01) | |
| *G08G 1/01* | (2006.01) | |
| *G01C 15/00* | (2006.01) | |
| *G06T 7/12* | (2017.01) | |
| *G06F 16/28* | (2019.01) | |
| *G01S 19/53* | (2010.01) | |
| *G06F 8/65* | (2018.01) | |
| *G08G 1/0962* | (2006.01) | |
| *G08G 1/052* | (2006.01) | |
| *G08G 1/0967* | (2006.01) | |
| *G01S 19/51* | (2010.01) | |
| *G08G 1/00* | (2006.01) | |
| *G06F 9/445* | (2018.01) | |
| *G06F 17/10* | (2006.01) | |
| *G08G 1/09* | (2006.01) | |

(52) U.S. Cl.
CPC ............ *G06F 16/284* (2019.01); *G06F 16/29* (2019.01); *G06F 17/10* (2013.01); *G06T 7/12* (2017.01); *G06T 17/05* (2013.01); *G08G 1/0112* (2013.01); *G08G 1/052* (2013.01); *G08G 1/093* (2013.01); *G08G 1/0967* (2013.01); *G08G 1/09623* (2013.01); *G08G 1/096716* (2013.01); *G08G 1/20* (2013.01)

(56) References Cited

U.S. PATENT DOCUMENTS

| | | | |
|---|---|---|---|
| 7,164,117 B2 | 1/2007 | Breed et al. | |
| 7,616,781 B2 | 11/2009 | Schofield et al. | |
| 8,731,305 B1 | 5/2014 | Mantri | |
| 9,361,797 B1 | 6/2016 | Chen et al. | |
| 9,672,734 B1 | 6/2017 | Ratnasignam | |
| 10,074,270 B2 | 9/2018 | Ivanov et al. | |
| 10,332,389 B2 | 6/2019 | Ivanov et al. | |
| 2002/0035432 A1* | 3/2002 | Kubica | G06F 16/29 702/5 |
| 2003/0023369 A1 | 1/2003 | Takashima | |
| 2003/0060970 A1* | 3/2003 | Edge | G01C 21/20 701/520 |
| 2006/0208169 A1 | 9/2006 | Breed et al. | |
| 2007/0213896 A1 | 9/2007 | Fischer | |
| 2008/0004789 A1 | 1/2008 | Horvitz et al. | |
| 2009/0005979 A1 | 1/2009 | Nakao et al. | |
| 2009/0140887 A1 | 6/2009 | Breed et al. | |
| 2009/0228204 A1 | 9/2009 | Zavoli et al. | |
| 2010/0020074 A1 | 1/2010 | Taborowski et al. | |
| 2010/0057336 A1 | 3/2010 | Levine et al. | |
| 2010/0082564 A1* | 4/2010 | Fernekes | G06F 16/29 707/705 |
| 2010/0198503 A1* | 8/2010 | Beckner | G06F 16/29 701/408 |
| 2010/0211309 A1* | 8/2010 | Sugawara | G01C 21/26 701/533 |
| 2010/0321489 A1 | 12/2010 | Chen et al. | |
| 2012/0197839 A1 | 8/2012 | Vervaet et al. | |
| 2012/0271864 A1 | 10/2012 | Morlock | |
| 2013/0007063 A1* | 1/2013 | Kalra | G06F 9/4493 707/796 |
| 2013/0328924 A1* | 12/2013 | Arikan | G06T 11/20 345/629 |
| 2014/0058661 A1 | 2/2014 | Choi et al. | |
| 2014/0306814 A1 | 10/2014 | Ricci | |
| 2016/0091323 A1 | 3/2016 | MacGougan et al. | |
| 2016/0167582 A1 | 6/2016 | Chen et al. | |
| 2016/0171893 A1 | 6/2016 | Chen et al. | |
| 2017/0120803 A1 | 5/2017 | Kentley et al. | |
| 2017/0268896 A1 | 9/2017 | Bai et al. | |
| 2017/0287233 A1 | 10/2017 | Nix | |
| 2017/0332198 A1 | 11/2017 | Dannenbring et al. | |
| 2018/0003512 A1 | 1/2018 | Lynch | |
| 2018/0023959 A1 | 1/2018 | Ivanov et al. | |
| 2018/0023964 A1 | 1/2018 | Ivanov et al. | |
| 2019/0114909 A1* | 4/2019 | Halama | G08G 1/0133 |

OTHER PUBLICATIONS

Final Office Action received for U.S. Appl. No. 15/653,308 dated Aug. 19, 2019, 45 pages.

Non-Final Office Action received for U.S. Appl. No. 15/653,314 dated Sep. 19, 2018, 15 pages.

Notice of Allowance received for U.S. Appl. No. 15/653,314 dated Feb. 7, 2019, 18 pages.

Notice of Allowance received for U.S. Appl. No. 15/653,321 dated May 7, 2018, 17 pages.

Non-Final Office Action received for U.S. Appl. No. 15/653,335 dated May 9, 2019, 15 pages.

Final Office Action received for U.S. Appl. No. 15/653,335 dated Sep. 25, 2019, 18 pages.

Non-Final Office Action received for U.S. Appl. No. 15/653,335, dated Jan. 21, 2020, 15 pages.

Non-Final Office Action received for U.S. Appl. No. 15/653,308, dated Jan. 30, 2020, 23 pages.

Final Office Action received for U.S. Appl. No. 15/653,308, dated Jun. 5, 2020, 23 pages.

Final Office Action received for U.S. Appl. No. 15/653,335, dated May 6, 2020, 9 pages.

Non-Final Office Action for U.S. Appl. No. 15/653,335; dated Sep. 1, 2020; 13 pages.

* cited by examiner

GENERATING ROAD SEGMENT ATTRIBUTES BASED ON SPATIAL REFERENCING

CROSS-REFERENCE TO RELATED APPLICATIONS

This application claims benefit of the U.S. Provisional Patent Application having Ser. No. 62/364,805 and filed on Jul. 20, 2016. The subject matter of this related application is hereby incorporated herein by reference.

BACKGROUND

Field of the Various Embodiments

The various embodiments relate generally to navigation subsystems and, more specifically, to generating road segment attributes based on spatial referencing.

Description of the Related Art

Many automobiles include navigation subsystems that perform navigation-related activities based on satellite navigation devices (e.g., global positioning system devices) and road databases that specify underlying, physical road networks. To enable a wide range of navigation-related activities, road databases are typically configured to associate data with road segments via attributes. More precisely, each attribute is associated with a road segment and specifies data that is related to the road segment or navigation of the road segment. As referred to herein, a road segment refers to any portion of a road between two discrete points. For example, an attribute could be associated with a road segment that lies between two intersections and specify a speed limit that is applicable between the two intersections.

One limitation of these types of attributes is that the attributes are typically associated with road segments based on syntax-specific linkages that may vary between formats and versions of the road databases. For instance, in many road databases, the specification of each attribute is based on a road segment identifier that designates the associated road segment within the road database. Further, for a given road segment, the corresponding road segment identifier typically varies based on the format and version of the road database. Consequently, a given road segment may be designated via one road segment identifier in one version of a road database and a different road segment identifier in another version of the road database irrespective of whether any geometry or topology associated with the underlying physical road network differs between the two versions. As a result, an attribute that is compatible with one format and one version of a road database may not be compatible with a different format and/or a different version of the road database.

Other techniques for specifying attributes that are associated with road segments involve similar dependencies on syntax-specific linkages that may vary between formats and versions of road databases. Accordingly, to properly specify data for a given road segment, multiple attributes are oftentimes generated, where each generated attribute is compatible with a specific format and a specific version of the road database. Further, if a new version or new format of an existing road database is generated, then new attributes are required irrespective of whether any data specified via the attributes changes or any geometry or topology associated with the underlying physical road network changes. As a general matter, generating and updating attributes that are associated with road segments may be time-consuming. Further, transmitting the attributes to different navigation sub systems may consume significant bandwidth.

As the foregoing illustrates, more effective techniques for specifying attributes associated with road segments would be useful.

SUMMARY

One embodiment sets forth a method for associating content with a road segment. The method includes generating a spatial reference identifier based on one or more coordinates that are associated with the road segment; generating an attribute based on the content and the spatial reference identifier; and transmitting the attribute to a first navigation system, where the first navigation system performs at least one navigation operation based on a first road database and the attribute.

Further embodiments provide, among other things, a system and a computer-readable medium configured to implement the method set forth above.

At least one advantage of the disclosed techniques is that an attribute application may generate a single attribute that is compatible with multiple road databases irrespective of the formats and versions of the road databases. By contrast, because a conventional attribute is dependent on the format and the version of a compatible road database, conventional approaches to generating an attribute for a road segment typically generate different conventional attributes for different formats and versions of road databases.

BRIEF DESCRIPTION OF THE DRAWINGS

So that the manner in which the above recited features can be understood in detail, a more particular description of the various embodiments, briefly summarized above, may be had by reference to certain embodiments, some of which are illustrated in the appended drawings. It is to be noted, however, that the appended drawings illustrate only typical embodiments and are therefore not to be considered limiting of scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

Road Database System

Figure 1:
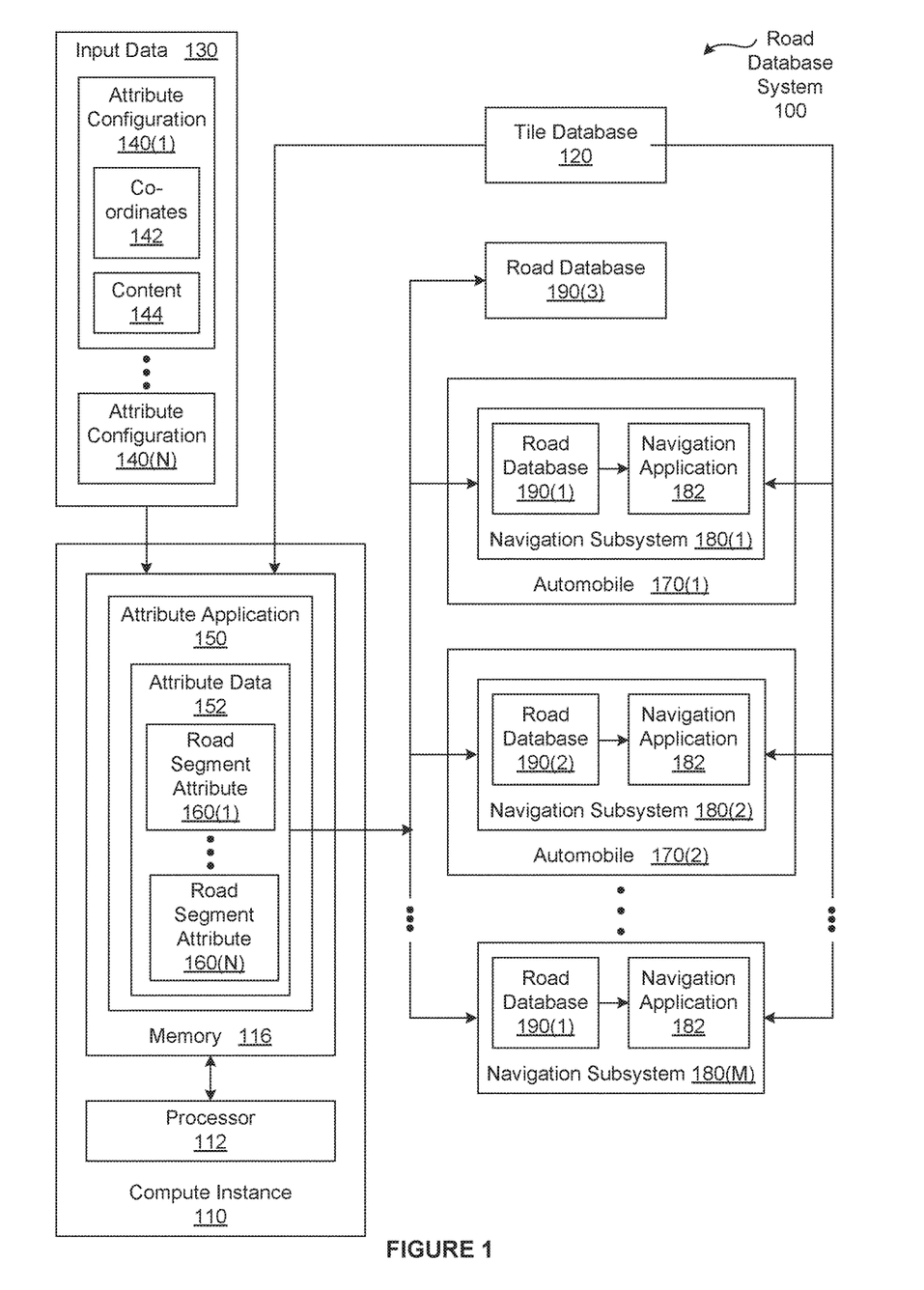
FIG. 1 illustrates a road database system configured to implement one or more aspects of the various embodiments.

FIG. 1 illustrates a road database system 100 configured to implement one or more aspects of the various embodiments. As shown, the road database system 100 includes, without limitation, navigation subsystems 180, road databases 190, automobiles 170, a compute instance 110, input data 130, and a tile database 120. In alternate embodiments, the road database system 100 may include any number (including zero) of navigation subsystems 180, road databases 190, automobiles 170, and compute instances 110. Further, the road database system 100 may include additional navigation subsystems 180 that are associated with any number and types of devices (e.g., bicycles, smartphones, etc.). For explanatory purposes, multiple instances of like objects are denoted with reference numbers identifying the object and parenthetical numbers identifying the instance where needed.

As shown, each of the navigation subsystems 180 includes, without limitation, a navigation application 182 and the road database 190. Each of the navigation applications 182 enables a user to perform navigation-related operations (e.g., viewing maps, generating and viewing directions and travel times, etc.) based on the associated road database 190 and, optionally, sensor data. For instance, the navigation subsystem 180(1) that is included in the automobile 170(1) enables the driver of the automobile 170(1) to efficiently navigate the automobile 170(1) via global positioning system (GPS) data received from a satellite navigation device associated with the automobile 170(1). In alternate embodiments, the navigation application 182(x) may be associated with any of the road databases 190 in any technically feasible fashion, and the navigation subsystem 180(x) does not necessarily include the road database 190(x). For example, the navigation application 182(x) could access the road database 190(3) via the Internet.

Each of the road databases 190 specifies at least a portion of an underlying, physical road network that includes any number and type of road segments. As referred to herein, a "road segment" may be any portion of a road that lies between two discrete points included in the road database 180. For example, a road segment could be a portion of a one-lane road that lies between two intersections or a portion of a freeway that lies between two exits. A given road database 180 typically maps each road segment to a road segment identifier that uniquely identifies the road segment within the road database 180. In addition, to enable a wide range of navigation-related activities, the road databases 180 are configured to associate data with road segments via attributes. More precisely, each attribute is associated with a road segment and specifies data that is related to the road segment or navigation of the road segment. For example, an attribute that is associated with a road segment that lies between two intersections could specify a speed limit that is applicable between the two intersections.

One limitation of conventional attributes for road segments is that the conventional attributes are typically associated with road segments based on syntax-specific linkages that may vary between formats and versions of the road databases 190. For instance, conventional attributes are often dependent on the road segment identifiers. Further, for each road segment, the corresponding road segment identifier may vary between different road databases 190 based on formats and versions associated with the road databases 190.

For example, a particular road segment could be identified as "R5" in the road database 190(1) that is associated with a first format and version, "R9" is the road database 190(2) that is associated with the first format and a second version, and "5B" in the road database 190(3) that is associated with a second format and a first version. In a complimentary fashion, a conventional attribute for the road segment would be specified based on the road segment identifier "R5" in the road database 190(1), the road segment identifier "R9" in the road database 190(2), and the road segment identifier "5B" in road database 190(3). If a new version of an existing road database 190 is generated, then new conventional attributes are also required irrespective of whether any data specified via the attributes changes or any geometry or topology associated with the underlying physical road network changes.

Accordingly, in a conventional road database system, to properly specify data for a given road segment, multiple conventional attributes are oftentimes generated, where each generated conventional attribute is compatible with a specific format and a specific version of the road database 190. Further, if a new version or new format of an existing road database 190 is generated, then new conventional attributes are required irrespective of whether any data specified via the conventional attributes changes or any geometry or topology associated with the underlying physical road network changes. As a general matter, generating and updating conventional attributes that are associated with road segments may be time-consuming. Further transmitting the conventional attributes to different navigation subsystems 180 may consume significant bandwidth.

Generating Road Segment Attributes that are Independent of Road Databases

To reduce the resources required to specify data associated with road segments across the road databases 190, the road database system 100 includes an attribute application 150. In general, the attribute application 150 generates attribute data 152 based on the input data 130. More precisely, for each attribute configuration 140 included in the input data 130, the attribute application 150 generates a road segment attribute 160. Each of the road segment attributes 160 specifies data associated with a road segment based on the topology and geometry of the underlying road network, instead of based on a road segment identifier included in any of the road databases 190. As shown, the attribute application 150 resides in a memory 116 that is included in the compute instance 110 and executes on a processor 112 that is included in the compute instance 110.

In alternate embodiments, the road database system 100 may include any number of compute instances 110, any number of memories 116, and any number of processors 112 that are implemented in any technically feasible fashion. In various embodiments, the compute instance 110 may be implemented as a stand-alone chip or as part of a more comprehensive solution that is implemented as an application-specific integrated circuit (ASIC), a system-on-a-chip (SoC), and so forth. Further, the compute instance 110, the memory 116, and the processor 112 may be implemented via any number of physical resources located in any number of physical locations. For example, the compute instance 110 could be implemented in a cloud computing environment, a distributed computing environment, a laptop, a tablet, a smartphone, and so forth.

The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112. The memory 116 may be one or more of a readily available memory, such as random access memory (RAM), read only memory (ROM), floppy disk, hard disk, or any other form of digital storage, local or remote.

In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, cloud storage, a Blu-ray Disc, other tangible storage media, or any suitable combination of the foregoing.

In operation, upon receiving the input data 130, the attribute application 150 generates the attribute data 152. As shown, the input data 130 includes, without limitation, any number of the attribute configurations 140. Each of the attribute configurations 140 includes, without limitation, content 144 and coordinates 142. The content 144 specify any amount and type of data that is related to a target road segment or navigation of a target road segment in any technically feasible fashion. For example, the content 144 of the attribute configuration 140(1) could include binary data that specifies any number of a speed limit, a functional road class, and a type of road, to name a few, that characterize the target road segment. As referred to herein, the "target road segment" of the attribute configuration 140 is the road segment that is associated with the content 144 included in the attribute configuration 140.

The coordinates 142 specify the location of any number of points that lie along the target route segment. For instance, in some embodiments, the coordinates 142 may include, without limitation, a latitude and a longitude associated with a mapping point. The "mapping point" may be any predetermined point along the route segment, such as the first point included in the route segment. In the same or other embodiments, the coordinates 142 may include a latitude and a longitude associated with a second point along the route segment that, in conjunction with the mapping point, defines a direction of the route segment. In various embodiments, the coordinates 142 may include one or more vertical coordinates that correspond to elevations associated with the route segment. The coordinates 142 may be specified in any technically feasible fashion. For example, a longitude included in the coordinates may vary from −180 to 180 degrees and be specified as a value that ranges from $-2^{31}$ to $2^{31}$. Similarly, a latitude included in the coordinates could vary from −90 to 90 degrees and be specified as a value that ranges from $-2^{30}$ to $2^{30}$.

For each attribute configuration 140, the attribute application 150 generates a single corresponding road segment attribute 160 that, together with the tile database 120, enables the navigation applications 182 to associate the content 144 with the target route segment irrespective of any version or format differences between the road databases 190. First, the attribute application 150 maps the coordinates 142 to a tile included in the tile database 120 and specifies the tile via a tile identifier (not shown in FIG. 1) included in the road segment attribute 160. The tile database 120 may be any set of tiles that are accessible to the navigation subsystems 180 and, together, represent a geographical region based on a predetermined tiling schema. For example, the tile database 120 could be a quadtree of tiles, where the highest level in the quadtree includes two tiles that represent the entire Earth.

After generating the tile identifier, the attribute application 150 generates a spatial reference identifier (not shown in FIG. 1) that enables the navigation subsystems 180 to identify the target route segment within the specified tile. More precisely, the spatial reference identifier specifies a sub-tile, an orientation, and a vertical level. The sub-tile is included in the tile and distinguishes the location of the mapping point with an accuracy of 1 meter. The orientation specifies the direction of the target route segment with an accuracy of 1 degree. The vertical level specifies a particular level (e.g., bridges, overpasses, etc.) in a predetermined vertical road hierarchy. In alternate embodiments, the spatial reference identifier may include any amount and type of spatial information that enables the navigation subsystems 180 to distinguish the target road segment from other road segments included in the associated tile independently of the corresponding road segment identifiers.

Advantageously, unlike conventional road segment attributes, a single road segment attribute 160 may configure the navigation applications 182 to associate the content 144 with the proper target road segment irrespective of the road segment identifiers included in the associated road databases 190. Further, unless the content 144 or the geometry or topology of the underlying road network changes, the road segment attribute 160 does not change. Accordingly, the attribute application 150 may perform comparison operations between a newly generated road segment attribute 160 and a previously generated road segment attribute 160 to determine whether the road segment attribute 160 has changed. If the road segment has not changed, then the attribute application 150 may discard the newly generated road segment attribute 160. If, however, the road segment has changed, then the attribute application 150 may transmit the newly generated road segment attribute 160 to the navigation subsystems 180. In addition, as shown, the attribute application 150 may store the newly generated road segment attribute 160 as part of a new version of the road database 190(3).

It will be appreciated that the road database system 100 shown herein is illustrative and that variations and modifications are possible. The number of compute instances 110, the number of navigation subsystems 180, the number of road databases 190, the number of automobiles 170, and the connection topology between the various units in road database system 100 may be modified as desired. Each of the navigation subsystems 180 may be implemented in a stand-alone fashion or integrated in any other device (e.g., bicycle, smartphone, tablet, etc.) in any technically feasible fashion. Further, the functionality included in each navigation subsystem 180 may be divided across any number of applications that are stored and executed via any number of devices that are located in any number of physical locations. For example, the navigation application 182 could be included in the navigation subsystem 180 of the automobile 170, and access an associated road database 190 via the Internet.

Figure 2:
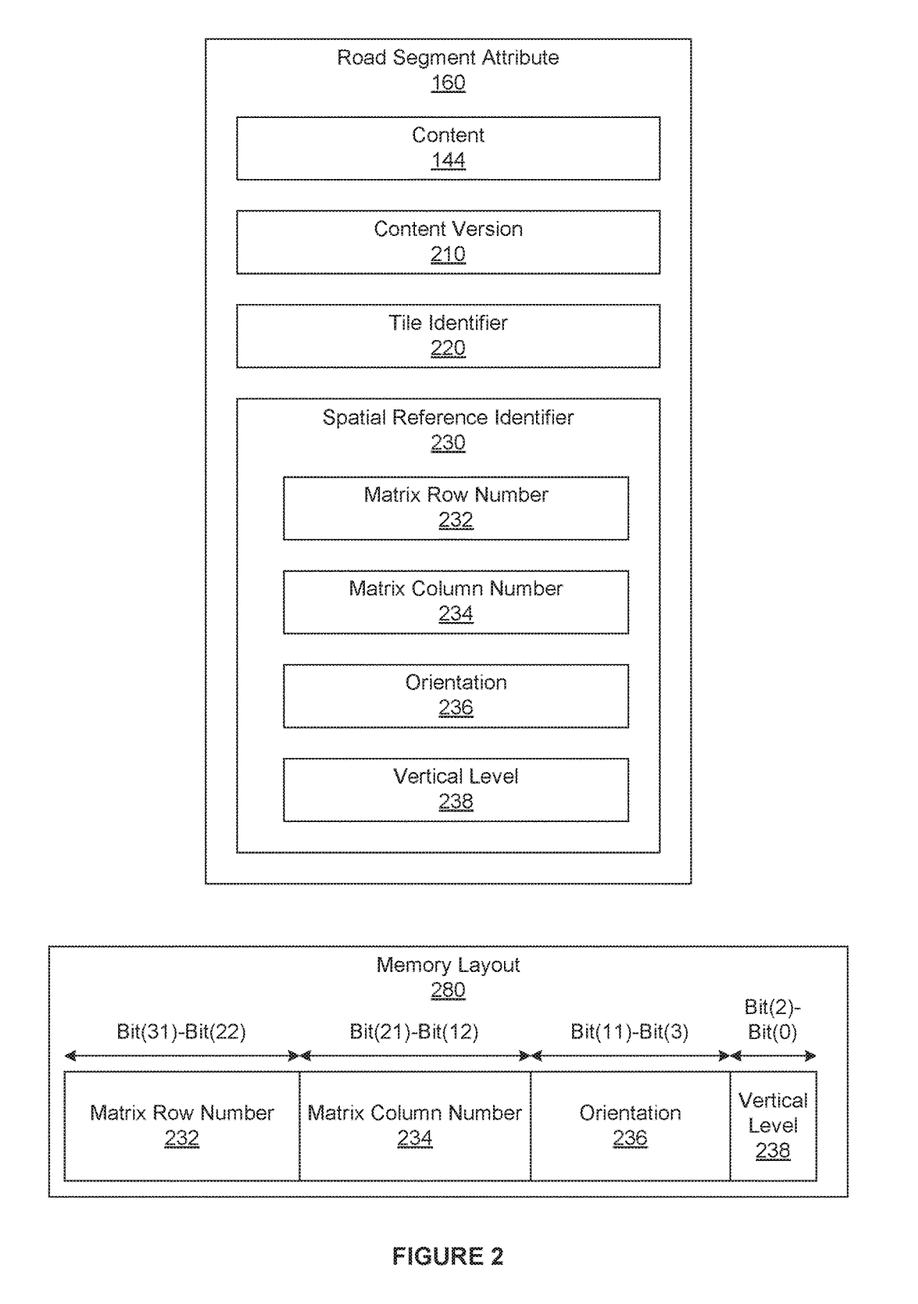
FIG. 2 is a more detailed illustration of the road segment attribute of FIG. 1, according to various embodiments.

FIG. 2 is a more detailed illustration of the road segment attribute 160 of FIG. 1, according to various embodiments. As shown, the road segment attribute 160 includes, without limitation, the content 144, a content version 210, a tile identifier 220, and a spatial reference identifier 230. As described herein, for each of the attribute configurations 140, the attribute application 150 generates the corresponding road segment attribute 160 that is associated with the corresponding target road segment. The target road segment may be in any portion of a road that extends from a first point to a second point. For example, the target road segment could be a portion of a road that lies between a highway entrance ramp and an intersection. Notably, the target road segment is identified via one identifier in the road database 190(1) and a different identifier the road database 190(2).

As described previously herein, the content 144 may include any amount and type of data that is associated with the target road segment in any technically feasible fashion. For example, the content 144 could include binary data that specifies any number of a speed limit, a functional road class, and a type of road, to name a few, that characterize the target road segment. As part of generating the road segment attribute 160, the attribute application 150 copies the content 144 included in the corresponding attribute configuration 140 to the road segment attribute 160. In alternate embodiments, the attribute application 150 may perform any number of processing operations that standardize the content 144 in any technically feasible fashion.

The content version 210 specifies a particular version that is associated with the content 144 included in the road segment attribute 160. Notably, the content version 210 is independent of any versions and formats of the road databases 190. The attribute application 150 may generate the content version 210 in any technically feasible fashion based on any type of data. For example, in some embodiments, the attribute application 150 may determine the content version 210 based on data received via an associated graphical user interface (not shown). In other embodiments, the attribute application 150 may determine the content version 210 based on a version included in the attribute configuration 140.

In alternate embodiments, the attribute application 150 may determine and/or modify the content version 210 based on the spatial reference identifier 230. For example, the attribute application 150 could initially set the content version 210 equal to one and generate an initial road segment attribute 160. After generating a subsequent road segment attribute 160, the attribute application 150 could determine that the spatial reference identifier 230 included in the initial road segment attribute 160 matches the spatial reference identifier 230 included in the subsequent road segment attribute 160. The attribute application 150 could then increment the previous content version 144 of 1 that is included in the initially generated road segment attribute 160 to generate the content version 144 of 2 for the subsequent road segment attribute 160. In other alternate embodiments, the road segment attribute 160 may not include the content version 210.

Notably, in various embodiments, each of the navigation subsystems 180 may request a portion of the road segment attributes 160 included in the attribute data 152 based on the content version 210. For example, to reduce the bandwidth required to transmit the road segment attributes 160 to the navigation subsystem 180(1), the navigation subsystem 180(1) could request that the attribute application 150 transmit the road segment attributes 160 that specify content versions 210 greater than 5. In alternate embodiments, for each navigation subsystem 180, the attribute application 150 may be configured to transmit only the road segment attributes 160 that specify the content version 210 that is more recent than a version that is associated with the attribute application 150.

The tile identifier 220 specifies a tile in the tile database 120 that includes the target route segment. In general, the attribute application 150 generates the tile identifier 220 based on mapping a longitude and a latitude included in the coordinates 142 to the tile database 120. The coordinates 142 may specify any number of points along the target route segment in any technically feasible fashion. The attribute application 150 selects the longitude and the latitude of a predetermined mapping point (e.g., the first point) along the target route segment and then computes the tile identifier 220 based on the tile schema associated with the tile database 120. In alternate embodiments, the attribute application 150 may generate the tile identifier 220 in any technically feasible fashion that is deterministic with respect to the coordinates 142 and consistent with the tile database 120.

Generating Spatial Reference Identifiers

To enable the navigation subsystems 180 to accurately identify the target road segment based on the road segment attribute 160, the road segment attribute 160 includes the spatial reference identifier 230. As shown, the spatial reference identifier 230 includes, without limitation, a matrix row number 232, a matrix column number 234, an orientation 236, and a vertical level 238. In conjunction with the tile identifier 220, the matrix row number 232 and the matrix column number 234 specify the mapping point associated with the target road segment. In a complementary fashion, the orientation 236 and the vertical level 238 specify, respectively, an orientation associated with the target road segment, and a vertical level associated with the target road segment. In alternate embodiments, the matrix row number 232, the matrix column number 234, the orientation 236 and the vertical level 238 may be defined in any technically feasible fashion that enables the navigation subsystems 180 to definitively identify the target road segment within the tile specified via the tile identifier 220.

More specifically, each tile included in the tile database 120 is partitioned into non-overlapping sub-tiles based on a predetermined sub-tiling schema that provide a distance accuracy of one meter or better and an angle accuracy of one degree or better. For example, each tile could be sub-divided into sub-tiles that each have a width of one meter and a height of one meter. In operation, the attribute application 150 computes the matrix row number 232 and the matrix column number 234 based on the sub-tiling schema and the coordinates 142. More precisely, the attribute application 150 maps the longitude and the latitude of the mapping point to the corresponding sub-tile included in the tile that is specified via the tile identifier 220. In general, the sub-tiling schema may define the mapping in any technically feasible fashion that is deterministic with respect to the coordinates 142 and consistent with respect to the navigation subsystems 180. Because of the determinism and the consistency that characterize the tiling schema and the sub-tiling schema, each of the navigation subsystems 180 may unambiguously map the tile identifier 220, the matrix row number 232, and the matrix column number 234 to the mapping point on the surface of the Earth.

In a similar fashion, the attribute application 150 computes the orientation 236 and the vertical level 238 based on, respectively, a predetermined orientation schema and a predetermined vertical level schema. The orientation schema and the vertical level schema may define the orientation 236 and the vertical level 238 in any technically feasible fashion that enables the navigation subsystems 180 to definitively distinguish the target road segment from any other road segments that are associated with the mapping point. As a result, the spatial reference identifier 280 enables the navigation subsystems 180 to distinguish between road segments that are associated with different directions and/or different orientations. Examples of different directions include Northwest, Southeast, 55 degrees clockwise from the North, and East, to name a few. Examples of different elevations include tunnels, bridges, overpasses, underpasses, surface-level roads, etc.

In some embodiments, the attribute application 150 computes the orientation 236 and the vertical level 238 based the coordinates 142. The coordinates 142 include a longitude and a latitude of at least a second point in addition to the longitudinal, the latitude, and an elevation of the mapping point. To determine the orientation 236, the attribute application 150 computes a road direction of the second point with respect to the first point, and then computes a counterclockwise angle between the road direction and a north direction in degrees. To determine the vertical level 238, the attribute application 150 maps the elevation to one of seven different levels, where each of the levels is defined based on the vertical level schema to correspond to a different range of vertical distances from a surface elevation.

In alternate embodiments, the attribute application 150 may determine the orientation 236 and the vertical level 238 in any technically feasible fashion based on any data. For instance, in some embodiments, the attribute configuration 140 includes the orientation 236 and/or the vertical level 238. In the same or other embodiments, the attribute application 150 may receive information that enables the attribute application 150 to determine the orientation 236 and/or the vertical level 238 via a graphical user interface (GUI).

In various embodiments, the attribute application 150 optimizes the memory required to store the route segment attribute 160 as well as the bandwidth required to transmit the road segment attribute 160. More specifically, the attribute application 150 stores the content 144 as a binary and each of the content version 210, the tile identifier 220, and the spatial reference identifier 230 as unsigned 32-bit integers. As shown in a memory layout 280, the attribute application 150 stores the matrix row number 232 as bits 31-22, the matrix column number 234 as bits 21-12, the orientation 236 as bits 11-3, and the vertical level 238 as bits 2-0.

Note that the techniques described herein are illustrative rather than restrictive, and may be altered without departing from the broader spirit and scope of the contemplated embodiments. Many modifications and variations on the functionality provided by the attribute application 150 will be apparent to those of ordinary skill in the art without departing from the scope and spirit of the described embodiments. For instance, in some embodiments, the attribute application 150 includes translation functionality, where the attribute application 150 generates the road segment attributes 160 based on an existing road database 190. Subsequently, the attribute application 120 may transmit the road segment attributes 160 to navigation subsystems 180 that include road databases 190 that are incompatible with the existing road database 190.

Figure 3:
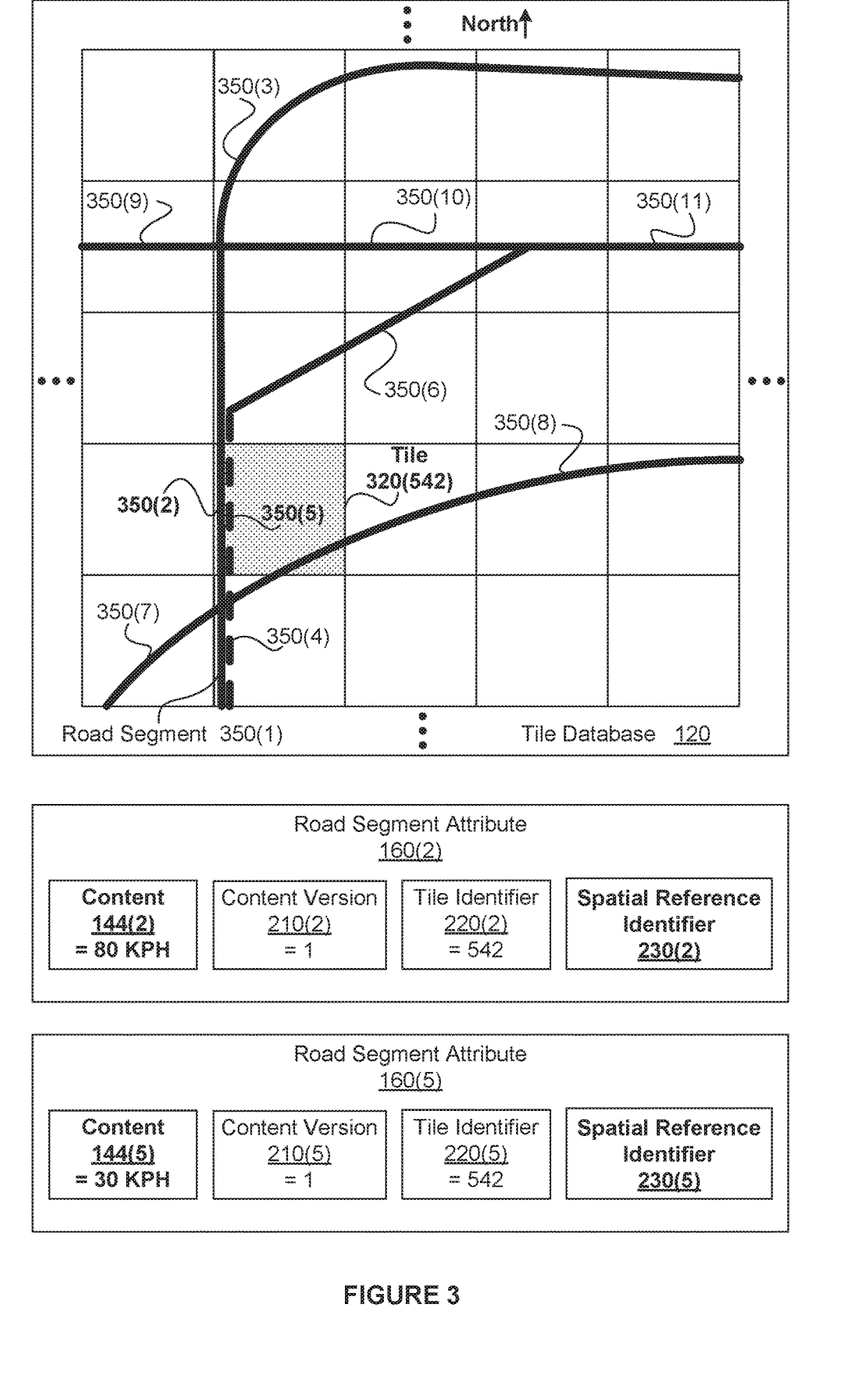
FIG. 3 illustrates examples of the road segment attributes of FIG. 2, according to various embodiments.

FIG. 3 illustrates examples of the road segment attributes 160 of FIG. 2, according to various embodiments. As shown, the tile database 120 includes any number of tiles 320 and represents a portion of the Earth that includes road segments 350. For explanatory purposes only, road segments 350 that comprise portions of surface level roads are depicted as solid, thick lines, road segments 350 that comprise bridges are depicted as dashed, thick lines, and a North direction is depicted with an arrow.

As shown, the road segment 350(2) is a portion of a surface road that lies between the road segment 350(7) and the road segment 350(9). The road segment 350(5) is a bridge that runs directly over and along the road segment 350(2) within the tile 320(542). Notably, within the tile 320(542), a single longitude x and a single latitude y specify two dimensions of both a three-dimensional point that lies along the road segment 350(2) and a three-dimensional point that lies along the road segment 350(5). For explanatory purposes only, the tile 320(542) is depicted with a dotted fill.

Although not shown in FIG. 3, the input data 130 includes, without limitation, the attribute configuration 140(2) and the attribute configuration 140(5). The attribute configuration 140(2) specifies the content 144(2) of "80 KPH" and the coordinates 142(2) that specify the road segment 350(2). In particular, the coordinates 142(2) include a mapping point m1 that lies within the tile 320(542) at a longitude of x1 and a latitude of y1. The attribute configuration 140(5) specifies the content 144(5) of "30 KPH" and the coordinates 142(5) that specify the road segment 350(5). In particular, the coordinates 142(5) include a mapping point m2 that lies within the tile 320(542) at a longitude of x1 and a latitude of y1.

As described previously herein, the attribute application 150 generates the road segment attribute 160(2) based on the attribute configuration 140(2) and the road segment attribute 160(5) based on the attribute configuration 140(5). Because the mapping point m1 and the mapping point m2 both have the longitude x1 and the latitude y1 that lies within the tile 320(542), the attribute application 150 sets both the tile identifier 220(2) and the tile identifier 220(5) equal to 542. However, because the elevation of the road segment 350(2) differs from the elevation of the road segment 350(5), the spatial reference identifier 230(2) and the spatial reference identifier 230(5) differ.

Figure 4:
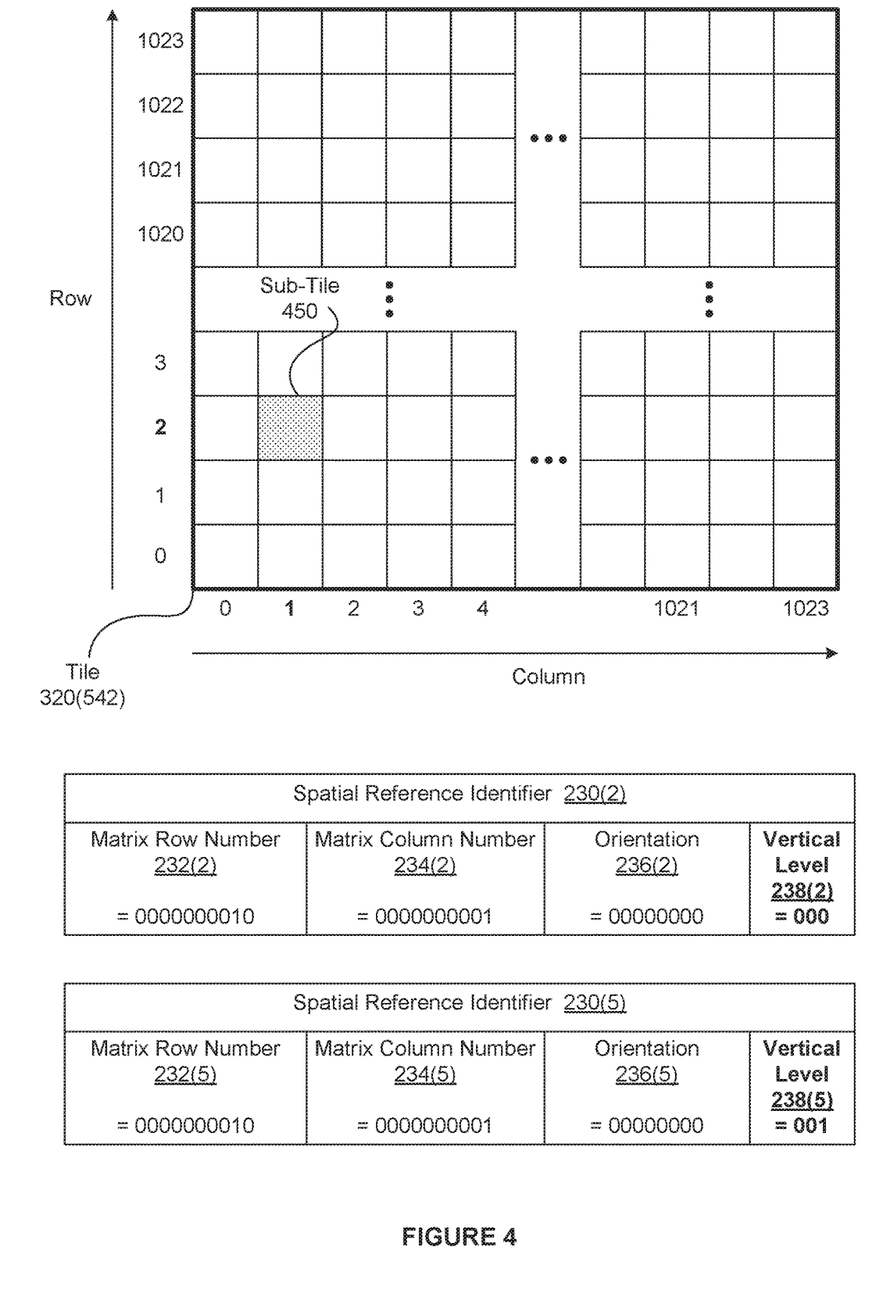
FIG. 4 illustrates examples of the spatial reference identifiers of FIG. 3, according to various embodiments.

FIG. 4 illustrates examples of the spatial reference identifiers 230 of FIG. 3, according to various embodiments. As shown, the attribute application 150 sub-divides the tile 320(542) of FIG. 3 into a 1024-by-1024 matrix of sub-tiles 450. Each of the sub-tiles 450 represents approximately a one meter by one meter portion of the Earth and is associated with a row and a column in the matrix. In alternate embodiments, the attribute application 150 may sub-divide any of the tiles 320 into any number of the sub-tiles 450 in any technically feasible fashion.

As described previously herein, the attribute application 150 generates the spatial reference identifier 230(2) based on the attribute configuration 140(2) that includes the coordinates 142(2), and the spatial reference identifier 230(5) based on the attribute configuration 140(5) that includes the coordinates 142(5). As described in conjunction with FIG. 3, the coordinates 142(2) include a mapping point m1 that lies within the tile 320(542) at a longitude of x1 and a latitude of y1. Further, the coordinates 142(5) include a mapping point m2 that lies within the tile 320(542) at a longitude of x1 and a latitude of y1.

As depicted with a dotted fill, the two-dimensional position specified by the longitude x1 and the latitude y1 lies within the sub-tile 450 associated with a row 2 and a column 1. Consequently, for each of the spatial reference identifier 230(2) and the spatial reference identifier 230(5), the attribute application 150 sets the matrix row number 232 equal to 2 and the matrix column number 234 equal to 1. For the spatial reference identifier 230(2), as per the attribute configuration 140(2), the attribute application 150 determines that a direction of the target road segment 350(2) is North. Accordingly, the attribute application 150 sets the orientation 236(2) to zero to specify North. Similarly, for the spatial reference identifier 230(5), as per the attribute configuration 140(5), the attribute application 150 determines that a direction of the target road segment 350(5) is North, and sets the orientation 236(5) to zero.

For the spatial reference identifier 230(2), because the attribute configuration 140(2) specifies a surface-level target road segment 350(2), the attribute application 150 sets the vertical level 238(2) to zero. By contrast, for the spatial reference identifier 230(5), because the attribute configuration 140(5) specifies a bridge, the attribute application 150 sets the vertical level 238(5) to one. Advantageously, referring back to FIG. 3, the differing vertical levels 238 enable the navigation subsystems 180 to properly associate the content 144(2) of 80 KPH with the road segment 350(2) and the content 144(5) of 30 KPH with the road segment 350(5) 30 KPH despite two-dimensional congruence.

Figure 5:
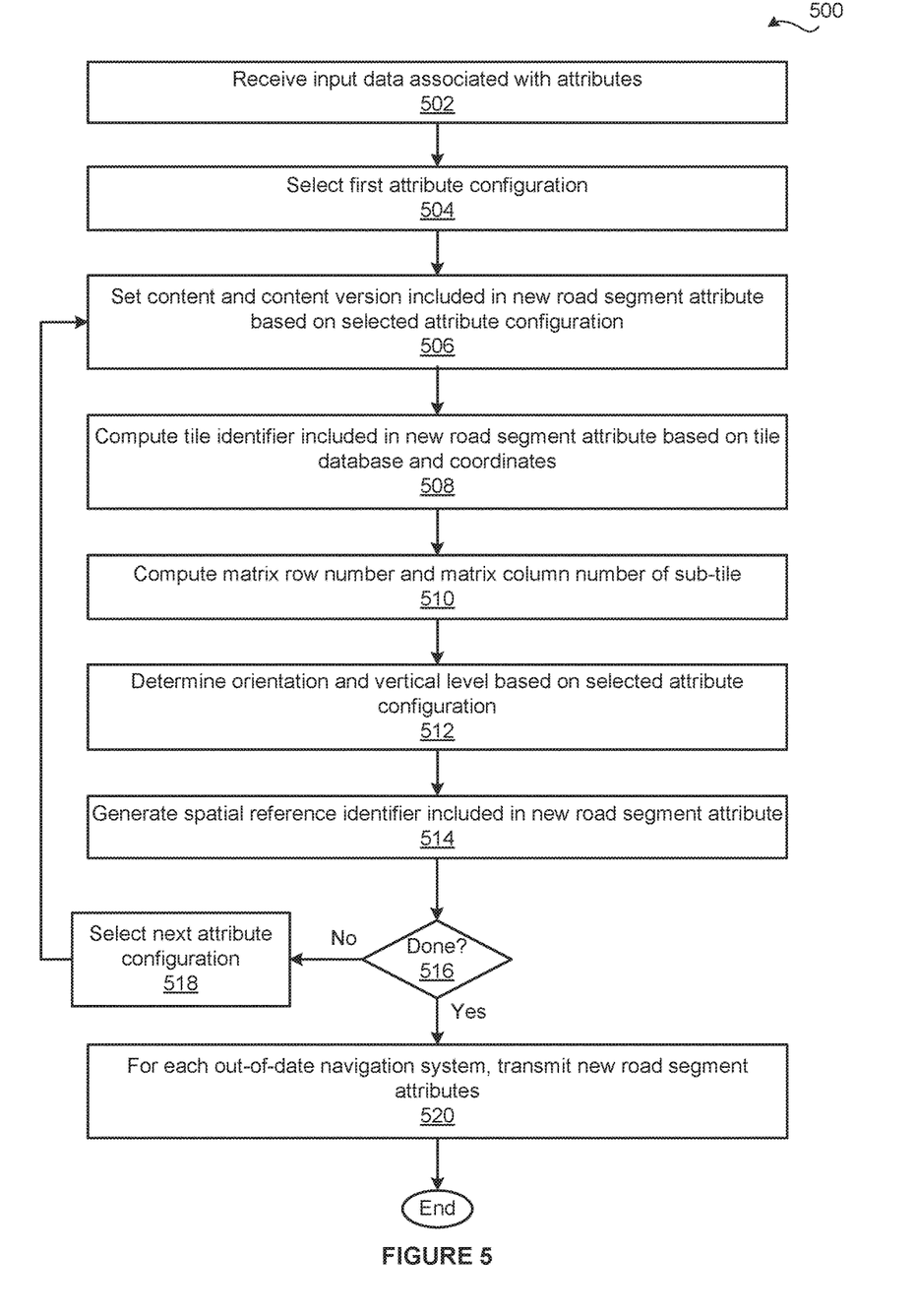
FIG. 5 is a flow diagram of method steps for specifying attributes associated with road segments based on spatial referencing, according to various embodiments.

FIG. 5 is a flow diagram of method steps for specifying attributes associated with road segments based on spatial referencing, according to various embodiments. Although the method steps are described in conjunction with the systems of FIGS. 1-4, persons skilled in the art will understand that any system configured to implement the method steps, in any order, falls within the scope of the contemplated embodiments.

As shown, a method 500 begins at step 502, where the attribute application 150 receives the input data 130. The input data 130 includes the attribute configurations 140 for any number of attributes that are associated with any number of target road segments 350. The attribute application 150 may receive the input data 130 in any technically feasible fashion. For example, the attribute application 150 could receive the input data 130 via a GUI. At step 504, the attribute application 150 selects first attribute configuration 140(1) included in the input data 130.

At step 506, the attribute application 150 sets the content 144 included in a new road segment attribute 160 equal to the content 144 included in the selected attribute configuration 140. As part of step 506, the attribute application 150 also sets the content version 210 included in the new road segment attribute 160. The attribute application 150 may determine the content version 210 in any technically feasible fashion. For example, in some embodiments, the content version 210 may be specified via a GUI. In other embodiments, the attribute application 150 may determine the content version 210 based on a version included in the selected attribute configuration 140. In alternate embodiments, the road segment attributes 160 do not include the content version 210, and step 506 is modified accordingly.

At step 508, the attribute application 150 computes the tile identifier 220 included in the new road segment attribute 160 based on the tile database 120 in conjunction with a longitude and a latitude specified via the coordinates 142 included in the selected attribute configuration 140. The tile database 120 includes any number of the tiles 320, where each of the tile 320 represents a non-overlapping range of latitudes and a range of longitudes based on a predetermined tiling schema. The tiling schema comprises any technically feasible infrastructure that partitions at least a portion of the Earth into tiles and defines mappings between latitudes and longitudes and the tiles 320.

At step 510, the attribute application 150 computes the matrix row number 232 and the matrix column number 234 that identify the sub-tile 450 based on a predetermined sub-tiling schema and the longitude and the latitude included in the coordinates 142. The attribute application 150 may implement any predetermined sub-tiling schema that partitions each of the tiles 320 into a matrix of the sub-tiles 450 based on longitudes and latitudes. In general, the sub-tiling schema provides a distance accuracy of one meter or better and an angle accuracy of one degree or better. As a result, the tiling schema and the sub-tiling schema enable the attribute application 150 to unambiguously specify a location of the road segment 350 based on the coordinates 142.

At step 512, the attribute application 150 determines the orientation 236 and the vertical level 238 that, in conjunction with the identified sub-tile 450, uniquely identify the target road segment 350 associated with the selected attribute configuration 140. The attribute application 150 may determine the orientation 236 and the vertical level 238 in any technically feasible fashion. In some embodiments, the selected attribute data 140 enables the attribute application 150 to determine the orientation 236 and/or the vertical level 238 directly or indirectly. For example, the coordinates 142 could include the longitudes and the latitudes for two different points that lie along the target road segment 350, and the attribute application 150 could compute the orientation 236 based on the two points. Further, the coordinates 142 could include an elevation associated with the target road segment 350, and the attribution application 150 could compute the vertical level 238 based on the elevation.

As a general matter, the syntax and semantics of the orientation 236 and the vertical level 238 may be defined in any predetermined fashion. For instance, in various embodiments the orientation 236 comprises nine bits that specify a counterclockwise angle between a direction associated with the target road segment and a North direction. In the same or other embodiments, the vertical level 238 may specify one of seven levels (e.g., a surface-level road, a bridge, a tunnel, an overpass, and an underpass, etc.).

At step 514, the attribute application 150 generates the new spatial reference identifier 230 included in the new road segment attribute 160 based on the row number 232, the column number 234, the orientation 236, and the vertical level 238. In some embodiments, the spatial reference identifier 230 comprises thirty-two bits, where bits 31-22 specify the matrix row number 232, bits 21-12 specify the matrix column number 234, bits 11-3 specify the orientation 236, and bits 2-0 specify the vertical level 238. Advantageously, representing the new spatial reference identifier 230 as a single thirty-two bit value optimizes the resources required to store and transmit the new spatial reference identifier 230 and the new road segment attribute 160.

At step 516, the attribute application 150 determines whether the selected attribute configuration 140 is the last attribute configuration 140 included in the input data 130. If, at step 516, the attribute application 150 determines that the selected attribute configuration 140 is not the last attribute configuration 140 includes in the input data 130, then the method 500 proceeds to step 518. At step 518, the attribute application 150 selects the next attribute configuration 140, and the method 500 returns to step 506 where the attribute application 150 generates a new road segment attribute 160 based on the selected attribute configuration 140.

If, however, at step 516, the attribute application 150 determines that the selected attribute configuration 140 is the last attribute configuration 140 included in the input data 130, then the method 500 proceeds directly to step 520. At step 520, for each out-of-date navigation subsystem 180 included in the road database system 100, the attribute application 150 transmits the newly generated road segment attributes 160. The attribute application 150 may determine whether each navigation subsystem 180 is out-of-date in any technically feasible fashion. The method 500 then terminates.

Advantageously, each of the spatial reference identifiers 230 reflect the geometry and topology of the underlying road network in a deterministic fashion that is immutable across different versions and format of the road databases 190. Accordingly, the attribute application 150 generates and transmits each of the new road segment attributes 160 to any number of different road databases 190 irrespective of differences among the versions and formats of the road databases. Further, in various embodiments, the attribute application 150 may generate ostensibly new road segment attributes 160 and then perform comparison operations (e.g., binary different operations) to determine whether each new road segment attribute 160 differs from a previously generated road segment attribute 160. If a given new road segment attribute 160 does not differ from the corresponding previously generated road segment attribute 160, then the attribute application 150 may discard the new road segment attribute 160 prior to transmitting the new road segment attributes 160 to the out-of-date navigation subsystems 190.

In sum, the disclosed techniques may be used to generate road segment attributes based on spatial referencing. A tiling schema defines mappings between coordinates that include latitudes and longitudes of points on the Earth and a two-dimensional surface that is divided into tiles. Each tile is further divided into a matrix of rows and columns. Upon receiving input data that specifies attribute data for any number of attributes, an attribute application automatically generates road segment attributes that are based on the underlying geometry and topology of a physical road network. Each attribute data includes, without limitation, coordinates associated with a target road segment and content. The road segment attribute includes, without limitation, a tile identifier, the content, a content version, and a spacial reference identifier. The spatial reference identifier includes, without limitation, a matrix row number, a matrix column number, an orientation of the target road segment, and a vertical level (e.g., bridge, tunnel, etc.) of the target road segment.

To generate a road segment attribute (including a spatial reference identifier) corresponding to given attribute data, the attribute application computes the tile identifier, the matrix row number, and the matrix column number based on the coordinates included in the attribute data. Subsequently, the attribute application determines the orientation and the vertical level that uniquely identify the target road segment based on the attribute data. After generating road segment attributes based on the input data, the attribute application transmits out-of-date road segment attributes to navigation subsystems that are included in a road database system. For each road segment attribute, the attribute application determines whether the road segment attribute is out-of-date with respect to navigation subsystems that are operating based on a given road database based on the content version included in the road segment attribute.

At least one advantage of the disclosed approach is that the specification of an attribute associated with a road segment is independent of manner in which the road segment is identified within a road database. By contrast, the specification of a conventional attribute associated with a road segment is dependent on the manner is which the road segment is identified within a road database. Accordingly, the attribute application requires fewer resources to generate and update road segment attributes for multiple road databases than conventional approaches to generating and updating conventional attributes. Further, the attribute application does not need to re-transmit a road segment attribute to navigation subsystems unless either the content of the road segment attribute changes or the topology and geometry of the underlying physical road network changes.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a " "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for associating content with a road segment, the method comprising:
   receiving an attribute configuration that includes the content;
   generating a spatial reference identifier based on one or more coordinates that are associated with the road segment, wherein the spatial reference identifier comprises a numerically-formatted integer that includes, as a separate and distinct bit fields, (i) a matrix row number, (ii) matrix column number, (iii) an orientation, and (iv) a vertical level as bit fields;
   generating a road segment attribute that includes both (i) the content included in the attribute configuration, and (ii) the spatial reference identifier; and
   transmitting the road segment attribute to a first navigation system,
   wherein the first navigation system performs at least one navigation operation based on a first road database, the road segment attribute, and the spatial reference identifier included in the road segment attribute.

2. The method of claim 1, further comprising:
   transmitting the road segment attribute to a second navigation system that performs at least one navigation operation based on a second road database and the road segment attribute,
   wherein a first road segment identifier that designates the road segment within the first road database differs from a second road segment identifier that designates the road segment within the second road database.

3. The method of claim 1, wherein:
   the matrix row number and the matrix column number specify a mapping point associated with the road segment;
   the orientation specifies an orientation associated with the road segment; and
   the vertical level specifies a vertical level associated with the road segment.

4. The method of claim 1, wherein the one or more coordinates include a longitude and a latitude, and generating the spatial reference identifier comprises computing the matrix row number and the matrix column number that specify a sub-tile associated with a tile based on the longitude and the latitude, wherein the tile is included in a tile-based representation of a geographical region.

5. The method of claim 4, wherein the tile-based representation of the geographical region comprises a quadtree of tiles that is accessible to the first navigation system.

6. The method of claim 1, wherein generating the spatial reference identifier comprises:
   determining a two-dimensional position associated with the road segment attribute based on the one or more coordinates; and
   determining at least one of the orientation associated with the road segment or the vertical level associated with the road segment.

7. The method of claim 1, wherein the one or more coordinates include a first longitude associated with a first point included in the road segment, a first latitude associated with the first point, a second longitude associated with a second point included in the road segment, and a second latitude associated with the second point included in the road segment.

8. The method of claim 7, wherein generating the spatial reference identifier comprises computing the orientation based on the first point and the second point, identifying a tile that is included in a tile-based representation of a geographical region based on the first longitude and the first latitude, and computing the matrix row number and the matrix column number that specify a sub-tile associated with the tile based on the first longitude and the first latitude.

9. One or more non-transitory computer-readable storage media including instructions that, when executed by one or more processors, configure the one or more processors to associate content with a road segment by performing steps of:
   identifying a tile and a sub-tile based on a latitude and a longitude of a first point that is associated with a road segment;
   generating a spatial reference identifier that specifies the sub-tile, wherein the spatial reference identifier comprises a numerically-formatted integer that includes, as separate and distinct bit fields, (i) a matrix row number, (ii) a matrix column number, (iii) an orientation, and (iv) a vertical level that as bit fields;
   receiving an attribute configuration that includes the content;
   generating a road segment attribute that includes both (i) the content included in the attribute configuration, and (ii) the spatial reference identifier; and
   transmitting the road segment attribute to a first navigation system,
   wherein the first navigation system performs at least one navigation operation based on a first road database, the road segment attribute, and the spatial reference identifier included in the road segment attribute.

10. The one or more non-transitory computer-readable storage media of claim 9, wherein:
    the tile is included in a tile-based representation of a geographical region, and
    the road segment attribute specifies the tile.

11. The one or more non-transitory computer-readable storage media of claim 9, wherein the steps further comprise:
    transmitting the road segment attribute to a second navigation system that performs at least one navigation operation based on a second road database and the road segment attribute,
    wherein a first road segment identifier that designates the road segment within the first road database differs from a second road segment identifier that designates the road segment within the second road database.

12. The one or more non-transitory computer-readable storage media of claim 9, wherein generating the spatial reference identifier comprises computing the matrix row number and the matrix column number that locate the sub-tile within the tile.

13. The one or more non-transitory computer-readable storage media of claim 9, wherein the tile is included in a quadtree of tiles, and the quadtree of tiles is accessible to the first navigation system.

14. The one or more non-transitory computer-readable storage media of claim 9, wherein the spatial reference identifier further specifies at least one of the orientation associated with the road segment or the vertical level associated with the road segment.

15. The one or more non-transitory computer-readable storage media of claim 14, wherein the vertical level is associated with at least one of a surface-level road, a bridge, a tunnel, an overpass, or an underpass.

16. The one or more non-transitory computer-readable storage media of claim 14, wherein the orientation specifies an angle between a direction associated with the road segment and a predetermined direction.

17. A system for associating content with a road segment, the system comprising:
   a memory storing an attribute application; and
   a processor coupled to the memory, wherein when executed by the processor,
      the attribute application configures the processor to:
         receiving an attribute configuration that includes the content;
         generate a spatial reference identifier based on a two-dimensional point associated with the road segment, wherein the spatial reference identifier comprises a numerically-formatted integer that includes, as separate and distinct bit fields, (i) a matrix row number, (ii) a matrix column number, (iii) an orientation associated with the road segment, and (iv) a vertical level associated with the road segment as bit fields;
         generate a road segment attribute that includes both (i) the content included in the attribute configuration, and (ii) the spatial reference identifier; and
         transmit the road segment attribute to a first navigation system,
         wherein the first navigation system performs at least one navigation operation based on a first road database, the road segment attribute, and the spatial reference identifier included in the road segment attribute.

18. The system of claim 17, wherein, when executed by the processor, the attribute application further configures the processor to:
   transmit the road segment attribute to a second navigation system that performs at least one navigation operation based on a second road database and the road segment attribute,
   wherein a first road segment identifier that designates the road segment within the first road database differs from a second road segment identifier that designates the road segment within the second road database.

19. The system of claim 17, wherein the two-dimensional point is associated with a longitude and a latitude.

20. The system of claim 17, wherein the vertical level is associated with at least one of a surface-level road, a bridge, a tunnel, an overpass, or an underpass.

* * * * *

UNITED STATES PATENT AND TRADEMARK OFFICE
CERTIFICATE OF CORRECTION

PATENT NO. : 11,468,765 B2
APPLICATION NO. : 15/653326
DATED : October 11, 2022
INVENTOR(S) : Volodymyr Ivanov and Alexey Pryakhin It is certified that error appears in the above-identified patent and that said Letters Patent is hereby corrected as shown below:

In the Claims

Column 15, Claim 1, Line 25, please delete "matrix" and insert --a matrix--.

Signed and Sealed this
Twenty-ninth Day of November, 2022

Katherine Kelly Vidal
*Director of the United States Patent and Trademark Office*